United States Patent [19]

Aminder et al.

[11] Patent Number: 5,083,359
[45] Date of Patent: Jan. 28, 1992

[54] SHIELDING OF MAGNETOELASTIC TORQUE TRANSDUCERS FROM LOW-FREQUENCY MAGNETIC FIELDS

[75] Inventors: Christer Aminder; Jarl R. Sobel, both of Västerås, Sweden

[73] Assignee: Asea Brown Boveri AB, Västeråa, Sweden

[21] Appl. No.: 660,844

[22] Filed: Feb. 26, 1991

[30] Foreign Application Priority Data

Feb. 28, 1990 [SE] Sweden .................................. 9000716

[51] Int. Cl.⁵ .......................... G01L 3/10; H01F 41/00
[52] U.S. Cl. .................................. 29/602.1; 73/862.36
[58] Field of Search ................. 29/602.1, 606, 593; 73/862.36, DIG. 2; 324/209; 336/20

[56] References Cited
U.S. PATENT DOCUMENTS 4,506,544 3/1986 Blomkvist et al. ............... 73/862.36

4,780,671 10/1988 Hase et al. ..................... 73/862.36 X

*Primary Examiner*—Carl E. Hall
*Attorney, Agent, or Firm*—Watson, Cole, Grindle & Watson

[57] ABSTRACT

A method for preventing magneto-elastic torque transducers (1,2) from being influenced by a static, axially-extending magnetic field (9) comprises dividing the driving shaft between the driving source and the load in such a way that the shaft (3) between the driving source and the transducer shaft and the shaft (4) between the transducer shaft and the load, respectively, are provided with a shaft part (7,8) of non-magnetic material and that the transducer and the transducer shaft including the non-magnetic shaft parts are surrounded by an external magnetic shield (5) provided with flanges such that a very small air gap is present between the shield and the non-magnetic shaft parts.

1 Claim, 1 Drawing Sheet

SHIELDING OF MAGNETOELASTIC TORQUE TRANSDUCERS FROM LOW-FREQUENCY MAGNETIC FIELDS

TECHNICAL FIELD

The present invention relates to a method for shielding magnetoelastic torque transducers from static or quasistatic magnetic fields axially extending in the shaft between the driving source and the driven load.

BACKGROUND ART

As is well known, magnetoelastic transducers are based on the measurement of the permeability change which takes place in a magnetic material when subjected to the influence of a force. The measuring principles and configuration of these transducers are known and described in a plurality of publications and patent specifications, inter alia in EP 0089916, U.S. Pat. No. 4,506,554 and Swedish patent application 8904307-9. Briefly, it may be stated that a magnetoelastic torque transducer comprises a transducer shaft and a stationary casing comprising a magnetic yoke as well as excitation and measuring windings. However, no detailed description thereof will be given here.

Regardless of which method is used to measure the permeability change, the magnetic hysteresis curve, that is, the B-H curve, traversed by each point in the material during a period of the magnetization, will be changed when the material is, in addition, magnetized by a static field. This, of course, influences the measurement and leads to changes of the measured signal in case of an unloaded transducer, that is the zero signal, and of the sensitivity of the transducer to the influence of forces.

If the transducer is so heavily magnetized by a static field that the ferromagnetic material approaches saturation, the differential permeability as well as the sensitivity of the transducer will be very low. However, the influence remains in connection with considerably lower fields.

To reduce the effect of external static fields, attempts have been made to shield off such fields. However, this has proved to be a difficult technical problem. The traditional method is to surround the transducer with a magnetic shield made of highly permeable material, for example of mu-metal. However, such a design mainly serves as a shield against magnetic fields in the air which are directed across the transducer shaft.

However, according to the above, a torque transducer forms a link in a torque transmission between a driving source and a load. A remanent axial magnetic field in some of the parts in this transmission may then be conducted directly into the transducer shaft without being diverted by an external shield.

The problem with static external magnetization may become particularly serious since static magnetization, by remanence in the transducer material, may also give rise to permanent changes in the operation of the transducer.

The above-mentioned Swedish patent application 8904307-9 discloses an electrical method of minimizing the effect of an external static or quasi-static magnetic field. The method is based on the fact that an external magnetic field causes the measured signal to comprise even harmonics, together with the odd harmonics of the fundamental tone of the magnetization. The magnitude of the even harmonics is a measure of the magnitude of the external magnetic field. By measuring the even harmonics and using this as an input signal to a regulator, the external magnetization may be reduced to zero with the aid of direct current in some suitable winding.

SUMMARY OF THE INVENTION

The transducer shaft of magnetic material constitutes part of the magnetic shaft which connects the driving source to the driven load. If in some way a magnetic flux may arise in the shaft, this will therefore also pass through the transducer shaft and is able to influence the torque measurement in the manner described. As explained above, a shield surrounding the transducer will not be able to divert from the transducer the magnetic flux in the shaft.

A method according to the invention means that the driving shaft between the driving source and the load is divided in such a way that the part between the driving source and the transducer shaft and the part between the transducer shaft and the load, respectively, are made of non-magnetic material. By providing the transducer and the transducer shaft, including the non-magnetic shaft parts, with an external magnetic shield with flanges so that there will be a very small air gap between the shield and the periphery of the non-magnetic shaft parts, an axial magnetic flux will be conducted past the transducer in the external magnetic shield.

DESCRIPTION OF THE PREFERRED EMBODIMENTS

Figure 1:
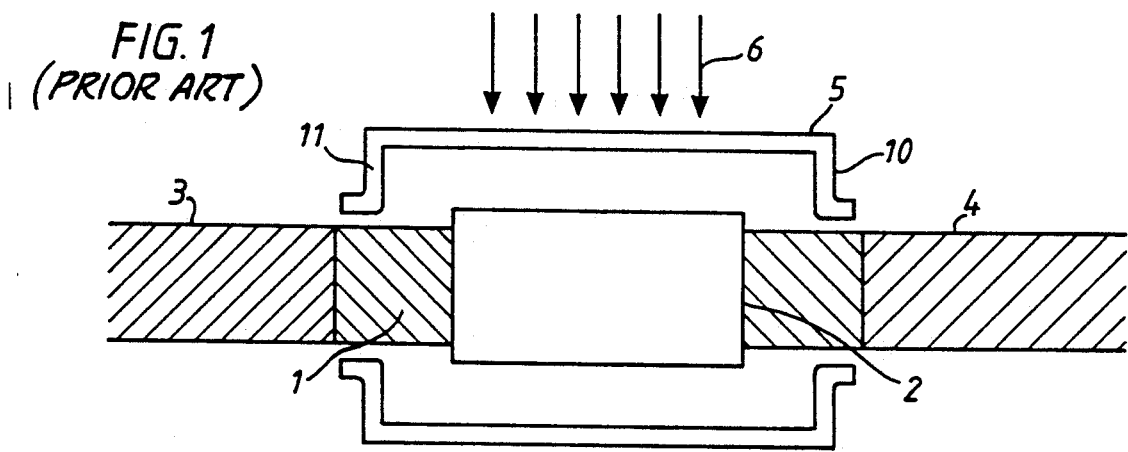
FIG. 1 shows how a shield is applied around a magnetoelastic transducer according to the state of the art.

FIG. 1 shows an example of the state of the art for protecting a torque transducer against an external magnetic field present in the air and directed across a transducer shaft. The transducer shaft is shown at 1 and the stationary surrounding casing of the transducer with windings, etc., is shown at 2. Welded or otherwise fixed to one end of the transducer shaft is a first shaft part 3 towards a driving source, and, in similar manner, fixed to the other end of the transducer shaft is a second shaft part 4 towards the driven load. A soft-magnetic shield 5 then protects the transducer against an external magnetic field 6 directed across the transducer shaft.

Figure 2:
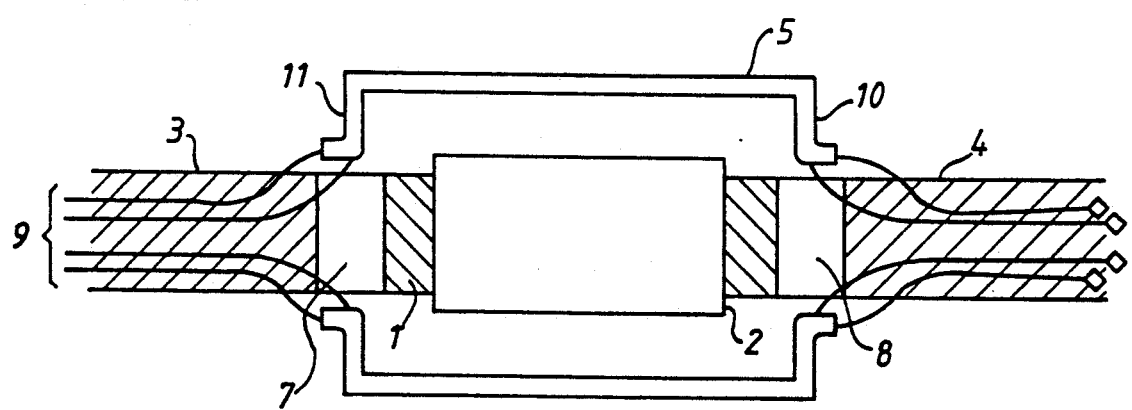
FIG. 2 shows how to perform a shielding of an external static or quasi-static magnetic field according to the invention.

A preferred embodiment according to the invention for shielding the transducer from an axial magnetic field moving in the shaft between the driving source and the load is shown in FIG. 2. In the same way as in FIG. 1 and with the same reference numerals, FIG. 2 shows a transducer shaft, a casing, shaft parts towards the driving source and towards the driven load, respectively, and a surrounding magnetic shield. Specific to the invention, as described under "Summary of the Invention" is that between the transducer shaft and the previously mentioned first shaft part 3 towards the driving source and between the transducer shaft and the previously mentioned second shaft part 4 towards the driven load, respectively, a third shaft part 7 and a fourth shaft part 8, respectively, of non-magnetic material are attached. A consequence of this is that any magnetic flux lines 9 extending in the shaft, as regards the transducer region, pass in the surrounding magnetic shield 5 with flanges 10 and 11 formed such that the air gaps between these and the periphery of the shaft are as small as possible and thus cannot influence the torque measurement.

We claim:

1. A method of shielding a magnetoelastic torque transducer from an external magnetic field, said magnetoelastic torque transducer having a casing containing a magnetic yoke and excitation and measuring windings, and a transducer shaft passing through the casing, the transducer shaft extending between a first shaft part connectable to a driving source and a second shaft part connectable to a driven load a which comprises the steps of (a) attaching a third shaft part between the transducer shaft and the first shaft part, said third shaft part being composed of non-magnetic material, (b) attaching a fourth shaft part between the transducer shaft and the second shaft part, said fourth shaft part being composed of non-magnetic material, and (c) positioning a magnetic shield having flanges around said transducer so that magnetic flux lines from the shield will pass into the first and second shaft parts and away from the casing.

* * * * *